May 22, 1951  A. C. RICHARDSON ET AL  2,553,788
APPARATUS FOR DISPERSING VITAMIN CARRYING
MEDIUMS IN FOOD PRODUCTS
Filed Feb. 1, 1946  2 Sheets-Sheet 1

ALAN C. RICHARDSON
JOHN E. DIMICK
Inventors

By Lyon & Lyon
Attorneys

May 22, 1951

A. C. RICHARDSON ET AL 2,553,788

APPARATUS FOR DISPERSING VITAMIN CARRYING
MEDIUMS IN FOOD PRODUCTS

Filed Feb. 1, 1946

INVENTORS
ALAN C. RICHARDSON
JOHN E. DIMICK

By Lyon & Lyon
Attorneys

Patented May 22, 1951

2,553,788

UNITED STATES PATENT OFFICE 2,553,788

APPARATUS FOR DISPERSING VITAMIN CARRYING MEDIUMS IN FOOD PRODUCTS

Alan Campbell Richardson, Berkeley, and John Estes Dimick, El Cerrito, Calif., assignors to California Packing Corporation, San Francisco, Calif., a corporation of New York Application February 1, 1946, Serial No. 644,930

10 Claims. (Cl. 222—70)

This application is a continuation in part of the copending application of Alan C. Richardson, Serial No. 463,550 filed October 27, 1942, issued as U. S. Patent No. 2,395,067, February 19, 1946.

This invention relates to apparatus for proportioning a vitamin carrying medium in a food product, and is more particularly directed to the provision of apparatus for distributing vitamin carrying oils of comparatively high concentration in a food product such as a feed for fowl, cattle, horses or the like to insure uniform distribution of the vitamins of such oil throughout the feed or fodder.

In the fortifying of feeds or fodder for fowl, cattle, horses or the like, particularly with such vitamins as vitamin D and vitamin A, it has been the practice to fortify such feeds using a mixture of relatively low vitamin concentration which enables the vitamin to be dispersed through the feed in the relatively large quantity of carrier, or oil.

When using a large volume of carrier, vitamins may be easily dispersed through the feed by a simple mixing operation because the low concentration of vitamin in the large quantity of oil permits obtaining of a uniform distribution. The use of such large quantities of oil, however, is objectionable due to the fact that the oils ordinarily employed are what may be classified as drying oils so that they have no value, or substantially no value, in the feed and merely tend to increase its cost.

The oils which have been commonly used as carriers are the fish and fish liver oils such, for example, as sardine oil and cod liver oil. These oils are relatively expensive in relation to their vitamin content and their value as oils is substantially lost when they are introduced into the feed.

The conventional apparatus for continuously mixing animal and poultry feeds as employed by present day feed mills produces a large variety of feed formulae which differ in amounts and proportions of various ingredients. Frequent changes in the setting of feeding devices are therefore necessary. Since very few, if any, feed mills store any considerable amount of mixed feed but on the contrary the practice is to load it for shipment directly from the sacking machine, the result is that extreme flexibility in the mixing apparatus is highly important. Feed mills now in operation may make as many as twenty changes of formula per day and have been observed to operate for as short a time as three minutes on a particular formula. This procedure is made necessary by the practice of shipping mixed loads of feed which may include as many as twenty or thirty different items. The condition just described makes it undesirable to rely upon the skill of an operator for making manual adjustment in the flow of vitamin rich oil to suit the requirements of the various feed formulae. While a skillful operator may be able to withdraw from inventory approximately the correct volume of vitamin rich oil during his particular shift, the minute by minute or hour by hour input of oil frequently shows tremendous variation from the correct rate of feed for the particular formula involved. It is therefore a particular object of this invention to provide dispersing apparatus of the type described which is incidentally adjustable for its rate of output with a very considerable degree of accuracy and which performs with efficiency over widely different rates of output.

Another object of our invention is to provide the improved apparatus for carrying out the process described in the copending Richardson patent referred to above.

Another object is to provide a novel fluid-measuring dispensing device capable of unvarying performance over a period of time and constantly adjustable to produce widely varying rates of flow.

Other objects and advantages of this invention will be apparent from the hereinafter contained description of the preferred embodiment thereof diagrammatically illustrated in the accompanying drawings wherein.

Figure 1:
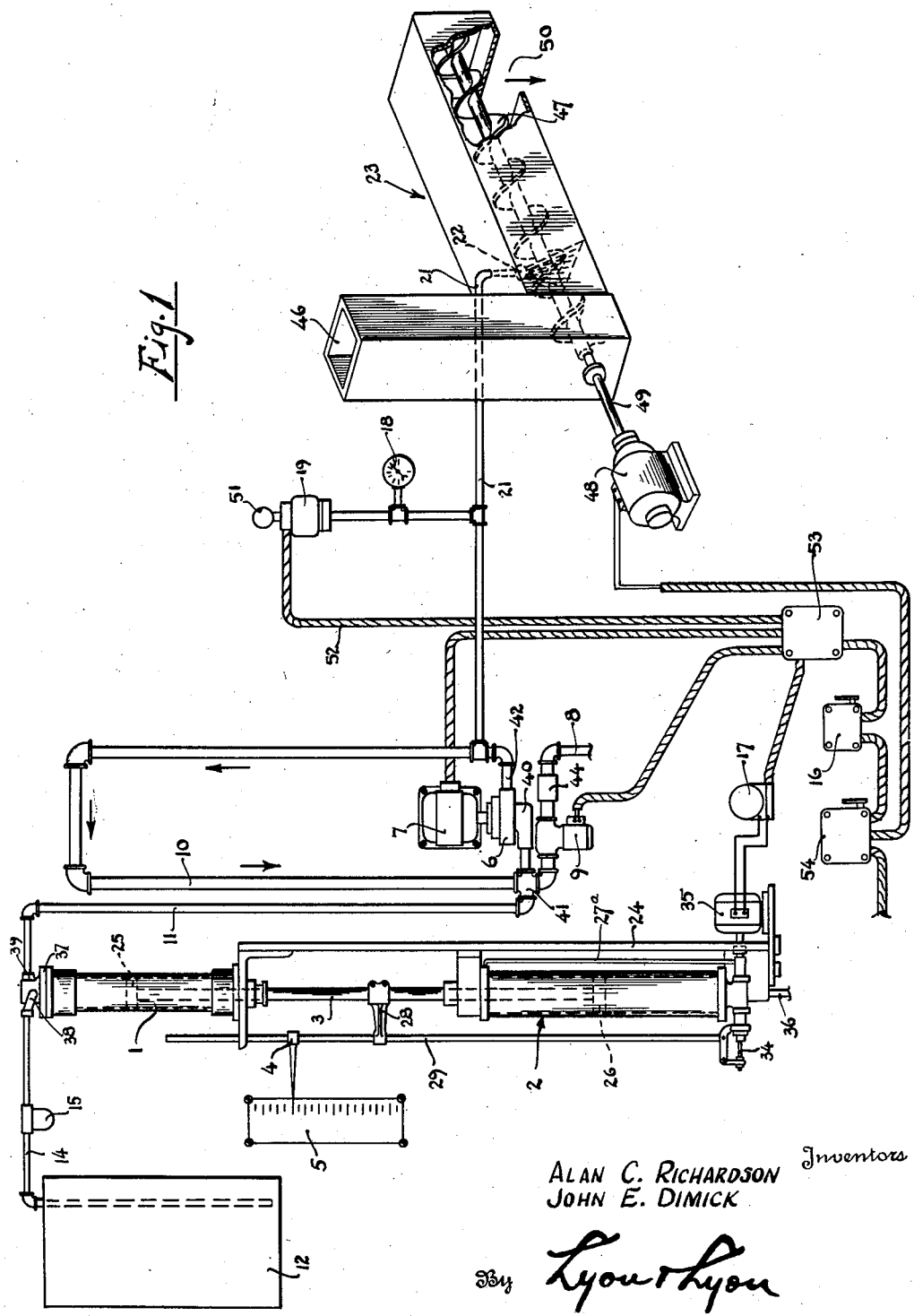
Figure 1 shows a preferred embodiment of our invention in a diagrammatic form.
Figure 2:
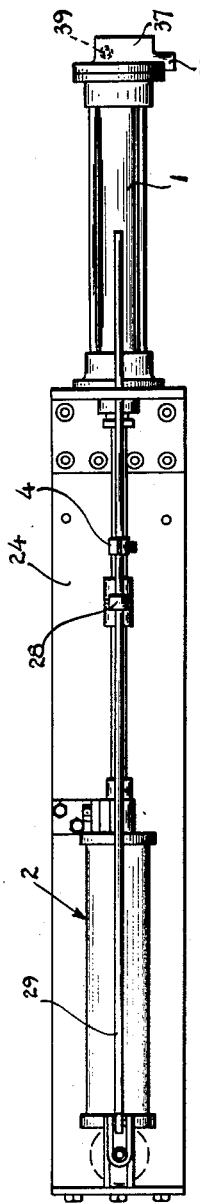
Figure 2 is a plan view of a power operated metering device employed in connection with our invention.
Figure 3:
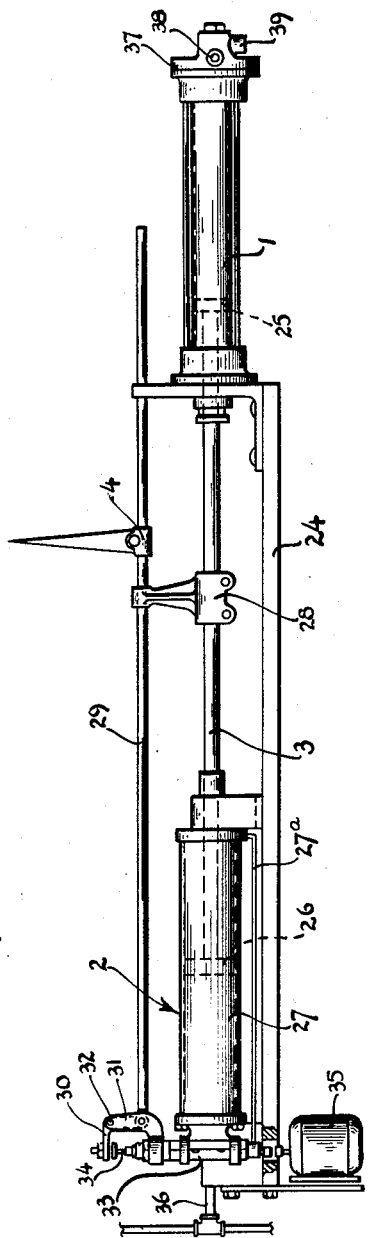
Figure 3 is a side elevation of the device shown in Figure 2.
Figure 4:
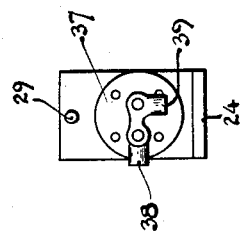
Figure 4 is an end elevation of the metering chamber connections, as shown in Figures 2 and 3.

Referring to the drawings, a relatively small bore, long stroke oil measuring cylinder 1 is connected to a reciprocable air motor 2 by means of the metering rod 3. A plate 24 is rigidly connected to the oil measuring cylinder 1 and the air motor 2 for maintaining them in spaced relationship. One end of the metering rod 3 is connected to the piston 25 within the cylinder 1 and the other end is connected to the piston 26 within the cylinder 27 of the reciprocable air motor 2.

Fixed on the metering rod 3 between the air motor 2 and the oil measuring cylinder 1 is an actuating arm 28 which extends laterally for sliding contact on the control rod 29. The control rod 29 is pivotally connected at its lower end to a bellcrank 30 which is supported on a bracket 31 by means of a pivot pin 32. The bracket 31 is secured to a valve housing 33 which is fixed on the lower end of the cylinder 27. The valve rod 34 extends axially through the housing 33 for operation of a valve element, not shown. One end of the rod 34 is adapted to be actuated by the bellcrank 30 and the other end is connected for operation of the solenoid 35. Actuation of the solenoid 35 serves to move the rod 34 away from the solenoid 35 to cause the valve to admit compressed air from the supply line 36 into the cylinder 27 below the piston 26, and simultaneously vent the space within the cylinder 27 above the piston 26, via return pipe 27a and vent port (not shown). This admission of compressed air raises the piston 26 within the cylinder 27 until the actuated arm 28 engages the adjustable stop element 4 on the control rod 29. The upward motion of the piston 26 and metering rod 3 continues and moves the control rod 29 until the motion of the control rod 29 causes the bellcrank 30 to return the valve rod 34 to its initial position. In the initial position the valve within the housing 33 acts to vent the space within the cylinder 27 below the piston 26 via the vent port and apply pressure above the piston 26 through pipe 27a to move it to its extreme lower position. The piston 26 and the meter rod 3 are not again raised until the solenoid 35 is actuated.

The adjustable stop element 4 carries a pointer which is attached to cooperate with a calibrated scale 5 to enable the operator instantly to select the desired stroke length necessary to produce the desired output.

The oil measuring cylinder 1 is provided with an end fitting 37 having inlet and discharge ports 38 and 39 respectively. The inlet port 38 is connected to a sight feed indicator 15 by means of the oil inlet pipe 14. The inlet pipe 14 communicates with a reservoir 12 holding a supply of vitamin rich oil. The discharge line 11 conveys oil under pressure from the discharge port 39 to a fitting 41 which forms a portion of an endless loop or circulating pipe generally designated 10. A centrifugal pump 6 driven from an electric motor 7 is provided for circulating fluid through the endless system 10. The pump inlet 40 and the pump discharge 42 are both connected to the circulating pipe 10.

Also connected to the fitting 41 is the water supply line 8 which incorporates a normally closed solenoid valve 9 and a check valve 44. The water supply admitted through the inlet 8 is preferably obtained from a constant pressure source such as an elevated tank (not shown) having a constant level. The vitamin rich oil which is admitted from the discharge line 11 and the water which is admitted from the supply line 8 are emulsified in the circulating pipe 10 by action of the centrifugal pump 6. The emulsion thus formed is maintained by the motion through the piping. The emulsion is discharged under pressure from the piping 10 by way of the discharge line 21. The atomizing nozzle or spray discharge orifice 22 is provided at the end of the discharge line 21 for spraying the emulsion into the feed mixer 23. The mixer 23 includes a vertical chute 46 through which the feed descends. A rotary screw 47 within the mixer 23 is driven by the motor 48 through shaft 49 and serves to progress the feed through the mixer 23 under the spray nozzle 22. The feed mixture then drops out of the mixer 23 through an opening 50 positioned adjacent the far end of the screw 47.

A branch line connects the discharge pipe 21 with a pressure gage 18 and a pressure actuating electric switch 19. An alarm device 51 which may comprise, for example, a signal light, is mounted adjacent the pressure switch 19, which is electrically connected by means of conduit 52 to an interrupter switch 53. The interrupter switch 53 receives electrical power through a dispenser switch 16 which in turn is connected to a master switch 54. The electric clock-driven timer 17, the solenoid valve 9, and the motor 7 each receive electric power from the interrupter switch 53. In the event that the emulsion pressure in the discharge line 21 should exceed a predetermined limit, the pressure switch 19 actuates the interrupter switch 53 to stop the flow of electric power to the timer 17, solenoid valve 9, and the motor 7.

In the operation of this device, the operator closes the master switch 54 which energizes the motor 48 to start the travel of feed through the mixer 23. This action supplies power through the dispenser switch 16 which is normally closed but which may be opened, if required, in the event that it should be desired to convey food through the mixer 23 without the addition of vitamin rich oil. When the switch 16 is in its normally closed position, the power is supplied through the interrupter switch 53 to operate the timer 17 and to start rotation of the motor 7 for operating the centrifugal pump 6, and the solenoid valve 9 is moved to open position. The clock-driven timer 17 may be of a conventional construction, and the opening and closing of contacts with the circuit which it controls may be adjusted for "on" time and "off" time. As shown in the drawings, the timer 17 is electrically connected to the solenoid 35 for actuation of the valve rod 34 controlling admission of compressed air to the air motor 2. When the timer 17 energizes the solenoid 35, compressed air moves the piston 26 and metering rod 3 upwardly. The upward movement of the metering rod 3 moves the piston 25 upwardly within the oil measuring cylinder 1 to discharge vitamin rich oil through the line 11 and through the circulating pipe 10. Check valves (not shown) are provided within the fitting 37 for both inlet 38 and discharge 39 to prevent reverse flow of oil through the lines 11 and 14. The water admitted through the check valve 44 and the solenoid valve 9 also enters the circulating pipe 10 and the centrifugal pump 6 agitates the mixture of oil and water to form a temporary emulsion. This emulsion passes outwardly through the discharge line 21 to the spray nozzle 22. In the event that the nozzle should become clogged, the increase in pressure in the discharge line 21 would actuate the pressure switch 19 and thereby cause the switch 53 to interrupt flow of power to the timer 17 and motor 7, as well as to close the solenoid valve 9 against the entrance of water. The check valve 44 is provided to prevent back-flow of emulsion into the water supply.

The relative concentration of vitamin rich oil within the emulsion as discharged by the nozzle 22 may be very rapidly and accurately changed by simply moving the position of the adjustable stop element 4 on the control rod 29, and the calibrated scale 5 is provided for indicating the rate of flow of oil.

From a consideration of the above description and method of operation, it will be apparent that the device embodying our invention affords a positive feed mechanism for accurately controlling and for uniformly dispersing a vitamin bearing oil within a feed or fodder. The simplicity of operation is particularly desirable since the operating conditions in many feed mills may involve excessive dust and widely varying temperatures in addition to negligent personnel. The rate of discharge of vitamin rich oil is controlled by the electric clock motor which operates the timer 17, and hence the selected rate of discharge continues at a constant level within very close limits of accuracy.

While we have described the preferred embodiments of our invention, we are not to be limited to any of the details set forth herein, except as defined in the appended claims.

We claim:

1. In a fluid measuring and dispensing device, the combination of a fluid measuring cylinder having a piston therein, fluid inlet and discharge means associated with said cylinder, a reciprocable fluid motor adapted to actuate said piston, valve means for controlling the operation of the fluid motor, means including a timer for operating the valve means at predetermined intervals to initiate a stroke of the piston, a control rod operatively connected to the valve means for terminating that stroke of the piston, and relatively adjustable cooperating means on the fluid motor and the control rod adapted to actuate the control rod upon predetermined travel of said piston.

2. In a fluid measuring and dispensing device, the combination of a fluid measuring cylinder having a piston therein, fluid inlet and discharge means associated with said cylinder, a reciprocable fluid motor adapted to actuate said piston, valve means for controlling the operation of the fluid motor, means including a timer for operating the valve means at predetermined intervals to initiate a stroke of the piston, a control rod operatively connected to the valve means for terminating that stroke of the piston, and cooperating means on the fluid motor and the control rod adapted to actuate the control rod upon predetermined travel of said piston, said cooperating means including an adjustable stop element adapted to determine the length of said stroke.

3. In a fluid measuring and dispensing device, the combination of a fluid measuring cylinder having a piston therein, fluid inlet and discharge means associated with said cylinder, a reciprocable fluid motor adapted to actuate said piston, a valve for controlling the operation of the fluid motor, a solenoid adapted to move the valve to initiate the discharge stroke of the piston, timing means adapted to energize the solenoid at predetermined intervals, and means operatively connecting the valve with the piston to move the valve to terminate said discharge stroke in response to predetermined travel of the piston less than its full stroke.

4. In a fluid measuring and dispensing device, the combination of a fluid measuring cylinder having a piston therein, fluid inlet and discharge means associated with said cylinder, a reciprocable fluid motor adapted to actuate said piston, a valve for controlling the operation of the fluid motor, a solenoid adapted to move the valve to initiate the discharge stroke of the piston, timing means adapted to energize the solenoid at predetermined intervals, additional means operatively connecting the valve with the piston to move the valve to terminate said discharge stroke in response to predetermined travel of the piston, said additional means including an adjustable stop element adapted to determine the length of said discharge stroke.

5. In a fluid measuring and dispensing device, the combination of a fluid measuring cylinder having a piston therein, fluid inlet and discharge means associated with said cylinder, a reciprocable fluid motor adapted to actuate said piston, valve means for controlling the operation of the fluid motor, means including a timer for operating the valve means at predetermined intervals to initiate a stroke of the piston, a control rod extending parallel to the path of travel of said piston and operatively connected to the valve means for reversing said stroke, a stop element adjustably secured upon said control rod, and an element mounted for movement in accordance with the travel of said piston adapted to engage said stop element.

6. In a device of the class described, the combination of a relatively long fluid measuring cylinder having a relatively small bore and provided with a reciprocable piston in the bore, fluid inlet and discharge means associated with said cylinder, a fluid motor for reciprocating said piston, valve means for controlling operation of said fluid motor, means including a timer for moving the valve means at predetermined intervals to initiate a stroke of the piston, additional means for moving the valve means to terminate said stroke of the piston, and adjustable means associated with said additional means adapted to control the length of said stroke.

7. In a fluid measuring and dispensing device, the combination of a fluid measuring cylinder having a piston therein, fluid inlet and discharge means associated with said cylinder, a reciprocable fluid motor adapted to actuate said piston, valve means for controlling the operation of the fluid motor, means including a timer for operating the valve means at predetermined intervals to initiate a stroke of the piston, a control rod operatively connected to the valve means for terminating the stroke of the piston, and cooperating means on the fluid motor and the control rod adapted to actuate the control rod upon predetermined travel of the piston, said last means including an arm and an adjustable stop member adapted to be contacted by the arm.

8. In a fluid measuring and dispensing device, the combination of a fluid measuring cylinder having a piston therein, fluid inlet and discharge means associated with said cylinder, a reciprocable fluid motor adapted to actuate said piston, valve means for controlling the operation of the fluid motor, means including a timer for operating the valve means at predetermined intervals to initiate a stroke of the piston, a control rod operatively connected to the valve means for terminating the stroke of the piston, an arm rigidly secured to the fluid motor to reciprocate therewith, and an adjustable stop member mounted on said control rod, said stop member adapted to be contacted by said arm to actuate the control rod upon predetermined travel of the piston.

9. In a fluid measuring and dispensing device, the combination of a fluid measuring cylinder having a piston therein, fluid inlet and discharge means associated with said cylinder, a reciprocable fluid motor adapted to actuate said piston, a valve secured to the fluid motor for controlling the operation of the same, the valve having a valve stem, means including a timer for operating the valve at predetermined intervals to initiate a stroke of the piston, a bell crank pivotally connected to the valve, one leg of the bell crank being pivotally connected to the valve stem, a control rod pivotally connected to the other leg of the bell crank for terminating the stroke of the piston, and cooperating means on the fluid motor and the control rod adapted to actuate the control rod upon predetermined travel of the piston.

10. In a fluid measuring and dispensing device, the combination of a fluid measuring cylinder having a piston therein, fluid inlet and discharge means associated with said cylinder, a reciprocable fluid motor adapted to actuate said piston, a valve secured to the fluid motor for controlling the operation of the same, the valve having a valve stem, means including a timer for operating the valve at predetermined intervals to initiate a stroke of the piston, a bell crank pivotally connected to the valve, one leg of the bell crank being pivotally connected to the valve stem, a control rod pivotally connected to the other leg of the bell crank for terminating the stroke of the piston, an arm rigidly secured to the fluid motor to reciprocate therewith, and an adjustable stop member mounted on said control rod, said stop member adapted to be contacted by said arm to actuate the control rod upon predetermined travel of the piston.

ALAN CAMPBELL RICHARDSON.
JOHN ESTES DIMICK.

REFERENCES CITED

The following references are of record in the file of this patent:

UNITED STATES PATENTS

| Number | Name | Date |
|---|---|---|
| 1,047,492 | Bowser | Dec. 17, 1912 |
| 1,332,392 | Fulton | Mar. 2, 1920 |
| 1,529,914 | Richards | Mar. 17, 1925 |
| 1,534,349 | Albrecht | Apr. 21, 1925 |
| 1,540,592 | Best | June 2, 1925 |
| 1,586,770 | Badoux et al. | June 1, 1926 |
| 1,732,391 | Westworth | Oct. 22, 1929 |
| 1,764,926 | Bennet | June 17, 1930 |
| 1,808,804 | Baldner et al. | June 9, 1931 |
| 1,931,894 | Gill | Oct. 24, 1933 |
| 1,943,838 | Reswick | Jan. 16, 1934 |
| 1,984,296 | Witter | Dec. 11, 1934 |
| 2,302,526 | Card | Nov. 17, 1942 |